No. 691,691. Patented Jan. 21, 1902.
A. F. WYMAN.
COASTER BRAKE FOR BICYCLES.
(Application filed May 13, 1901.)
(No Model.)
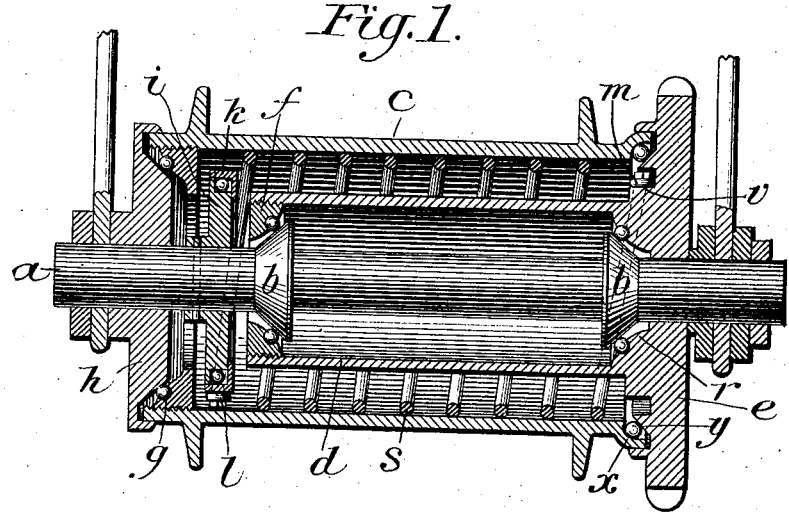
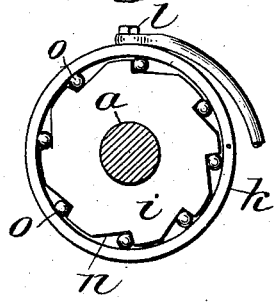
Witnesses:
J. C. Smith
E. C. Jones
Inventor:
Adolphus F. Wyman
by Henry W. Mason
Atty.

UNITED STATES PATENT OFFICE.

ADOLPHUS F. WYMAN, OF NEW BEDFORD, MASSACHUSETTS.

COASTER-BRAKE FOR BICYCLES.

SPECIFICATION forming part of Letters Patent No. 691,691, dated January 21, 1902.

Application filed May 13, 1901. Serial No. 60,099. (No model.)

*To all whom it may concern:*

Be it known that I, ADOLPHUS F. WYMAN, a citizen of the United States of America, and a resident of New Bedford, in the county of Bristol and State of Massachusetts, have invented certain new and useful Improvements in Coaster-Brakes for Bicycles, of which the following is a specification.

The accompanying drawings illustrate my invention, in which—

Figure 1 is a rear view, in longitudinal vertical section, of the hub of the propelling-wheel of a bicycle provided with my improvements. Fig. 2 is a side view of one of the operating parts.

Similar letters refer to like parts in both views.

The letter $a$ represents the stationary shaft of the bicycle, which is supported in the frame of the bicycle and is provided with the cones $b\ b$, integral therewith.

$e$ is the sprocket, having the cylinder $d$ integral therewith, in the bottom of which cylinder is formed the ball-cup $r$, the ball-cup $f$ being screwed in the end of the cylinder after the shaft $a$ is adjusted therein.

$v$ is a shoulder formed on the inner side of the sprocket $e$, to which is secured one end of the left-hand spiral spring $s$.

$i$ is a clutch which is rigidly secured to the shaft $a$, the construction of which is shown in Fig. 2, which shows that when the rim $k$ moves in a forward direction its motion is free; but when it moves in the opposite direction in a slight degree the balls $o$ roll up the inclines $n$ and prevent its further motion in that direction. To the rim $k$ of the clutch is secured the opposite end of the spring $s$. The clutch has its free motion when the wheel is being pedaled in a forward direction.

$c$ is the shell of the hub, having its ends provided with the ball-cups $x$ and $g$, the balls therein bearing on the cones $y$ and $h$. The coil of the spring $s$ is of slightly-larger diameter than the inside of the shell of the hub $e$, so that it shall be normally in frictional contact therewith.

The operation of the device is as follows: When force is applied to the sprocket to revolve the hub in a forward direction, the spring $s$, which normally bears against the inside surface of the shell $c$, is brought in still greater frictional contact therewith and by its friction thereon causes the hub to turn with the sprocket. In descending an incline, if the sprocket is held in a state of rest, the friction of the spring $s$ on the inside of the shell $c$ will sufficiently retard the motion of the wheel, and if the friction is too great the sprocket is revolved slightly in a backward direction by back-pedaling, which action, as the clutch $i$ cannot revolve backward, serves to wind the spring $s$ to a smaller spiral, thus removing to a greater or less extent its friction on the shell $c$. In coasting, where it is desired to have the hub turn freely without any retarding force, the sprocket is revolved in a backward direction by back-pedaling until the spring $s$ is wound to so small a spiral that it ceases to touch the inside of the shell $c$.

Having thus described my invention, what I claim, and desire to secure by Letters Patent, is—

A coaster-brake for a bicycle, comprising a stationary shaft, having ball-cones integral therewith; a cylinder or shell, surrounding said cones and adapted to revolve thereon by ball-bearings; a sprocket, integral with or secured to said cylinder; a shell or hub, surrounding said cylinder, adapted to revolve on ball-bearings between cones, one of which is integral with the sprocket, and the other secured to the stationary shaft; a spiral spring, surrounding said cylinder, having one end secured to the sprocket, a clutch, whose free movement is in a forward direction, secured to said shaft, and the opposite end of said spring, secured to said clutch, said spring being normally in frictional contact with the interior of said hub, and adapted to be wound to a smaller spiral, by the action of back-pedaling, substantially as shown, and described.

Signed by me at New Bedford, Massachusetts, this 18th day of April, 1901.

ADOLPHUS F. WYMAN.

Witnesses:
EDWARD P. HASKELL,
HENRY W. MASON.